(12) United States Patent
van Rijn

(10) Patent No.: US 6,574,604 B1
(45) Date of Patent: Jun. 3, 2003

(54) INTERNET MESSAGE SYSTEM

(76) Inventor: Percy van Rijn, 1023 Cordoba Way, Vista, CA (US) 92083

( * ) Notice: Subject to any disclaimer, the term of this patent is extended or adjusted under 35 U.S.C. 154(b) by 0 days.

(21) Appl. No.: 09/349,156

(22) Filed: Jul. 8, 1999

Related U.S. Application Data

(63) Continuation-in-part of application No. 08/645,279, filed on May 13, 1996, now abandoned.

(51) Int. Cl.⁷ .............................................. G06F 17/60
(52) U.S. Cl. .......................................... 705/1; 705/400
(58) Field of Search ........................... 283/117; 700/90, 700/231, 232, 233; 705/1, 400

(56) References Cited

U.S. PATENT DOCUMENTS

| | | | | |
|---|---|---|---|---|
| 4,786,994 A | * | 11/1988 | Sakamoto et al. ............ 355/20 |
| 4,959,670 A | * | 9/1990 | Thayer ........................... 396/2 |
| 4,965,673 A | * | 10/1990 | Bozzo et al. ................ 386/118 |
| 5,265,033 A | * | 11/1993 | Vajk et al. ................... 709/206 |
| 5,307,456 A | * | 4/1994 | MacKay et al. ............ 345/782 |
| 5,343,386 A | * | 8/1994 | Barber ........................ 700/90 |
| 5,426,594 A | * | 6/1995 | Wright et al. ............... 709/206 |
| 5,457,636 A | * | 10/1995 | Sansone et al. ............. 700/240 |
| 5,465,401 A | * | 11/1995 | Thompson .................. 455/558 |
| 5,479,411 A | * | 12/1995 | Klein ........................ 379/88.13 |
| 5,528,281 A | * | 6/1996 | Grady et al. .................. 725/93 |
| 5,555,357 A | * | 9/1996 | Fernandes et al. .......... 345/441 |
| 5,577,185 A | * | 11/1996 | Tunnell et al. .............. 345/473 |
| 5,647,002 A | * | 7/1997 | Brunson ..................... 709/206 |
| H1708 H | * | 2/1998 | Davidson et al. ........... 700/240 |
| 5,758,082 A | * | 5/1998 | Yumoto et al. ............. 709/219 |
| 5,768,142 A | * | 6/1998 | Jacobs ........................ 700/231 |
| 5,802,314 A | * | 9/1998 | Tullis et al. ................. 709/246 |
| 5,809,512 A | * | 9/1998 | Kato .......................... 707/502 |
| 5,875,110 A | * | 2/1999 | Jacobs ........................ 700/232 |
| 2001/0013123 A1 | * | 8/2001 | Freeman et al. .............. 725/34 |

FOREIGN PATENT DOCUMENTS

| WO | WO 97/14117 | * | 4/1997 |
|---|---|---|---|
| WO | WO 00/77748 | * | 12/2000 |

OTHER PUBLICATIONS

PR Newswire: "Liquidlidz.com Lets Web Surfers Design Their Own Hats; CheckMark Communications Provides Unique Hi-Tech Creative Shopping Solution"; Sep. 20, 1999.*

* cited by examiner

Primary Examiner—Edward R. Cosimano
(74) Attorney, Agent, or Firm—Peter A. Borsari

(57) ABSTRACT

An internet message system is provided that enables a user to compose an electronic greeting message and transmit the greeting message to any e-mail address over the Internet from a remote location. The internet message system is housed within a self-contained unit, such as a kiosk, such that it can be situated within various recreational and vacation locations. A payment system, incorporated within the internet message system, provides the user with access to the system upon receipt and verification of payment. In operation, the user selects from a variety of selectable greeting formats, including both real-time and pre-loaded still images, video segments, audio segments and text message lines, and combinations thereof which are integrated in the composition of the electronic greeting. In Included among the selectable greeting formats is real-time still images in the form of a self-portraits, such that the user can compose an electronic greeting depicting his/her own image as well as that of the surrounding background. Once the greeting is composed, it can be instantly transmitted over the Internet to the intended electronic mail address.

24 Claims, 3 Drawing Sheets

FIG. 3

GREETING FORMATS

- ☐ STILL IMAGES
  - SELF PORTRAIT
    - REAL-TIME BACKGROUND
    - PRE-LOADED BACKGROUND
  - PRE-LOADED STILL IMAGES
  - SCANNED IMAGES

- ☐ VIDEO SEGMENTS
  - REAL-TIME
  - PRE-LOADED

- ☐ AUDIO SEGMENTS
  - REAL-TIME
  - PRE-LOADED

- ☐ TEXT ARRANGEMENTS
  - REAL-TIME
  - PRE-LOADED

INTERNET MESSAGE SYSTEM

RELATED APPLICATIONS

This application is a continuation-in-part of U.S. patent application Ser. No. 08/645,279, filed May 13, 1996 now abandoned and entitled "Internet Message System".

FIELD OF INVENTION

The present invention relates to an internet message system that enables a user to electronically transmit a greeting message to any e-mail address over the Internet from a remote location. More particularly, the present invention provides an internet message system maintained within a housing and configured such that the greeting message may include the background area surrounding the housing. The housing may be in the form of a kiosk or similar structure. The greeting message provided by the internet message system can include text, a still image, a video segment, an audio segment or a combination thereof., both in real-time or selected from a pre-loaded collection. In a preferred embodiment, the internet message system also comprises a payment system which requires the user to submit payment prior to accessing the greeting message portion of the internet message system.

BACKGROUND OF THE INVENTION

Taking photographs, filming videos and sending postcards are among the ways individuals remember and share their vacations and other leisure activities with friends and family. Enjoyment of a particular point of interest, such as a national park, amusement park, resort, campground and the like, typically results in that individual desiring to send a greeting to another person. In the past, the sending of a postcard or written letter, sometimes with the inclusion of a photograph or two, has been the common, if not only, method of conveying a message. Thus, most vacation and leisure destination locations offer postcards, usually from a display rack or kiosk, depicting an image or images of the point of interest. The user purchases one or more postcards, writes a message, and mails it, sometimes taking several days to reach the intended recipient.

Within the last few years, the increased use and popularity of personal computers, as well as ease of access to the Internet, has resulted in the Internet becoming an alternate means of transmitting greetings, photographs and other messages. Today, many computer users have at least one mail address to receive mail electronically via the Internet. Indeed, with the onset of e-mail, mail delivered by the letter carrier has been referred to as "slow mail". Currently, several on-line sites offer electronic postcards that can be selected and personalized with a message and transmitted directly to a desired e-mail address, thereby reaching the recipient almost immediately, rather than several days. While some sites require the user to purchase an electronic postcard, other sites, such as Blue Mountain and Warner Brothers', have free on-line shops. In addition to the nearly instantaneousness delivery feature of e-mail transmitted over the Internet, e-mail also is environmentally friendly since no hard copies are produced, thus saving paper. In addition, no gasoline or other fuel products are used in the delivery of e-mail in contrast to postal delivery, thus lessening the impact on the environment.

The prior art is replete with postcard dispensing devices. For example, U.S. Pat. No. 5,457,636 to Sansone et al. discloses a postal kiosk system in which a user is provided with a mail piece, such as a postcard, once the user supplies the name and address to which the mail piece is to be sent. The kiosk then dispenses a finished mail piece to the user with the address printed thereon. In U.S. Pat. No. 5,343,386 to Barber et al., an apparatus is disclosed for automatically producing postcards incorporating a self-portrait of the user integrated into a pictorial digitized background stored in a computer database.

A drawback to both Barber et al. and Sansone et al. is the production of printed postcards in tangible form which requires the user to send the greeting by regular postal mail. In addition, although Barber et al. provides the user with a postcard having the user's self portrait, the background offered by Barber et al. is a standard stored background, rather than a real-time background that can be incorporated in the self-portrait of the user. Neither Barber et al. or Sansone et al. enable the user to transmit the postcard by electronic mail.

U.S. Pat. No. 5,426,594 to Wright et al. is directed to an electronic greeting card store and communication system comprising two personal communicators and an electronic mail server. The first personal communicator includes a memory for storing the electronic greeting cards from the supplier, a receiver, a controller and a transmitter. In operation, the user of the first personal communicator selects and receives an electronic greeting card from the memory which then is generated by the controller for greeting and sent by the transmitter to the electronic mail server which processes the selection and forwards it to the second communicator. An obvious and significant drawback to Wright et al. is the requirement that the user must carry the first personal communicator, rather than being able to access a standalone unit in a remote location. Another problem with Wright et al. is that the greeting cards available for transmission are selected from memory, rather than being a real-time self-portrait of the user which integrates the background surrounding the user into the electronic greeting.

Despite the attempts in the prior art, a need still exists for an internet message system that enables a user to transmit a greeting electronically from a remote location to any e-mail address. Such an internet message system should be capable of incorporating a real-time self portrait of the user or users integrated with the background surrounding the user(s). Such an internet message system also should be capable of enabling the user to composes an electronic greeting message from a variety of options, including still images, video segments, audio segments, text lines and combinations thereof, both in real-time and from pre-loaded collections. In addition, such an internet message system should enable the user to submit a photograph via a scanner for incorporation into the electronic greeting message. Such an internet message system also should be easy to use and have the capability of offering payment means in order to activate the system.

SUMMARY OF THE INVENTION

Accordingly, it is an object of the present invention to provide an internet message system which enables a user to transmit a greeting electronically from a remote location to any e-mail address.

It is an additional of the present invention to provide an internet message system which offers an electronic greeting message incorporating a real-time self portrait of the user or users integrated with the background surrounding the user(s).

It is another object of the present invention to provide an internet message system which enables the user to compose an electronic greeting message formatted from a collection of pre-loaded still images, video segments, audio segments, text lines and combinations thereof.

It is yet another object of the present invention to provide an internet message system which enables the user to compose an electronic greeting message formatted from real-time still images, video segments, audio segments, text lines and combinations thereof.

It also is an object of the present invention to provide an internet message system which allows the user to submit a photograph via a scanner for incorporation into the electronic greeting message.

It is a further object of the present invention to provide an internet message system which enables the user to compose an electronic greeting message using a combination of real-time, scanned and pre-loaded formats.

It is yet another object of the present invention to provide an internet message system which includes the use of a payment means in order to activate the system.

It is still another object of the present invention to provide an internet message system which is housed in a self-contained, weather proofed unit, such as a kiosk, for installation in a remote locations such as nature parks, amusement parks, campgrounds, resorts, shopping malls and the like.

It is still another object of the present invention to provide an internet message system which is simple and easy to use.

Additional objects, advantages and novel features of the invention will be set forth in part of the description which follows, and in part will become apparent to those skilled in the art upon examination of the following specification or may be learned by practice of the invention.

BRIEF DESCRIPTION OF THE DRAWINGS

The present invention will be better understood with reference to the appended drawing sheets, wherein:

FIG. 3 is an illustration of the several formats presented in the "Display Selection Menus" step S202 of FIG. 2 of the present invention.

DETAILED DESCRIPTION

The present invention relates to an internet message system for transmitting an electronic greeting over the Internet from a remote location to any e-mail address comprising an operating system 101, a power interface system 102 and a network interface/communication system 103. It is to be understood that the term "remote location" refers to any location in which the internet message system is situated, including for example, nature parks, theme or amusement parks, campgrounds, shopping centers, rest areas and the like. The internet message system is contained within a weather-proof housing thereby providing a self-contained unit which can be situated in most any type of setting. Preferably, the housing is a free-standing kiosk which can be configured in a standard construction format, thereby minimizing production costs and providing the user with an easily identifiable structure, or the kiosk can be constructed to be consistent with the theme of the park or other situs where it is to be located.

Figure 1:
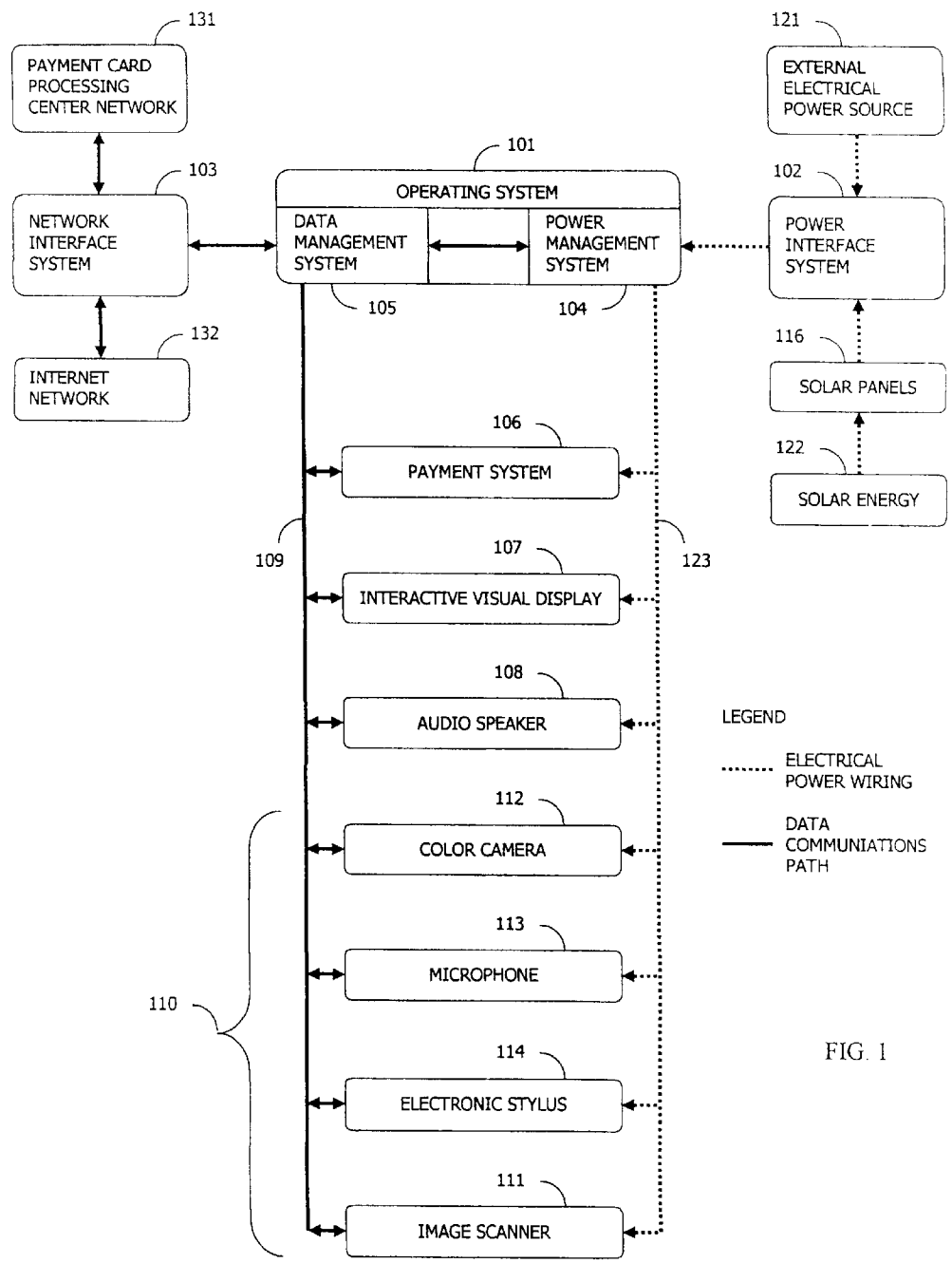
FIG. 1 is a systems layout block diagram of the components which may be included in the internet message system of the present invention.

Referring to FIG. 1, the operating system 101 is maintained within a central computer and controls a power management system 104 that interacts with the power interface system 102 and a data management system 105 that interacts with the network interface/communication system 103 and which also controls the several components used in accessing and composing the electronic greeting through communications path 109. Preferably, the central computer is a standard off-the-shelf computer, thereby offering prompt and easy replacement in the event that the computer malfunctions or breaks down, as well as reducing the construction cost of the housing. Minimum requirements for such a computer include, for example, a motherboard, a mass storage device, and I/O interface boards for integrating the several components used in accessing the system and composing the electronic greeting. The motherboard includes a central processing unit and memory with expansion slots for the controller boards for video, audio, digitizer and data I/O boards. The mass storage device preferably is either one or more hard disk units, one or more CD-ROM units, a combination of hard disk units and CD-ROM units or any other suitable storage device capable of maintaining a database of pre-loaded images, video clips, audio clips, textual lines, pre-recorded salutation messages, as well as the operating software required by the operating system 101. The central computer also includes a removable media storage device, such as a standard floppy disk or CD-ROM drive, in order to load and upgrade the operating software.

The central computer is provided with suitable software for operating and integrating the various components described herein, as well to present the user with all the necessary instructions for accessing and utilizing the internet message system, including the message compilation program which enables the user to compose his/her personalized electronic greeting. Of course, the instructions offered to the user can be offered in a single language, such as English, or multiple languages, such as English and Spanish. Although a standard, off-the-shelf computer is preferred for use in the present invention, it is to be understood that any type of computer system which is capable of interacting with the various components described herein is contemplated to be within the scope of this invention.

The data management system 105, which will be an integrated part of the operating system 101, is designed to control the data communications path 109 between the network interface system 103, the power management system 104, the payment system 106, an interactive visual screen 107, and audio speaker 108 and the several components used in composing the electronic greeting, generally referred to as the greeting composition components 110 and including an image scanner 111, a color camera 112, a microphone 113 and an electronic stylus 114.

The power interface system 102 can be powered by any suitable power source, including for example, an external electrical power source 121, or solar energy 122 in the form of solar panels 116 mounted external to housing of the internet message systems and energized by solar energy source 122. The power interface system 102 generates electrical power which is distributed by the power management system 104 to the operating system 101, network interface system 103, data management system 105 and to the message compilation components 110 by means of standard electrical wiring 123.

The network interface system 103 is configured to transmit and receive data from the data management system 105 to outside networks. Suitable outside networks contemplated for use by the present invention include, for example, a payment card processing center network 131 and the Internet network 132. The configuration of the network interface system 103 is dependent upon the availability of data transmittal sources. Thus, if access to a conventional dial-up telephone is feasible, the network interface system will comprise a link consisting of a standard modem capable of transmitting the electronic greeting within a specified time period. However, any suitable configuration capable of establishing an interface with the internet and with a payment card processing center network is entirely within the scope of the present invention as the network interface system link, including, for example, cable connection, infrared, microwave, satellite and other types of wireless communication.

Preferably, the internet message system of the present invention is activated by a payment system suitable examples of which include a cash device, similar to that of conventional vending machines that receive bills and coins, a pre-paid card device which is capable of receiving and translating fees from pre-paid cards such as telephone cards, a payment card (e.g. credit card or bank card) device, such as those that allow the user to slide his/her card through a magnetic strip reader, and combinations thereof. Payments in the form of cash or pre-paid cards are processed by the payment system 106 for verification of proper payment. A payment in the form of a credit card or bank card will cause the payment system to extract the necessary data from the payment card and communicate this information to the data management system 105 which will transmit the information to the proper payment card processing center network through the network interface system 103 for approval and authorization. When payment, regardless of form, has been verified, the payment system will transmit an activation code to the data management system thereby initializing the interactive visual screen 107 and enabling the user to begin compiling his or her personalized electronic greeting message.

The interactive visual screen 107 is designed to interact with the user of the internet message system of the present invention and includes selection menus and means to request appropriate responses. Preferably, the selection menus are in the form of touch screens, such as color LCD type or color CRT type. However, in order to comply with the Disabilities Act, any other form of selection device, including for example conventional mechanical buttons or verbal communication, such as through microphone 113 and speaker 108, can be utilized. The interactive visual screen 107 may consist of several display devices all controlled by the data management system. In operation, when the user is guided through the selection menus, the appropriate selection buttons will be presented on the interactive visual screen. Preferably, the interactive visual screen 107 also includes either a touchsensitive keyboard integrated within the screen or a conventional keyboard in order to establish alpha-numeric communication with the system. Alpha-numeric communication may be required, for example, in conjunction with the payment system, when the user is requested to submit a personal identification number (PIN) along with his/her credit or bank card. In addition, the keyboard can be used to compose a textual message for incorporation into the electronic greeting.

The message compilation components 110 include an image scanner 111, a color camera 112, a microphone 113 and an electronic stylus 114. The image scanner is provided in order to scan images, such as a regular photograph, and the image data from the scanned image is communicated through data communications path 109 to the operating system 101 where it will be stored in a digitized format. The image data then is displayed on the interactive visual screen 107 so that the user can view and approve the image. The image scanner can be a standard off-the-shelf scanner, preferably a photograph image scanner, or can be any suitable image scanner having a technical resolution sufficient to produce a clear image of the photograph.

Color camera 112 is installed within the housing of the internet message system in such a manner that the focal point and view angle of the camera is capable of including the user or users and the surrounding environ. For instance, when the housing is in the form of a kiosk situated in a nature park with a waterfall, the focal point of the camera could be the waterfall or the user(s) standing in front of the waterfall. Preferably, the camera 112 is an auto-focusing camera with a large section of the field of view on which it focuses. Optionally, means are provided to allow the user to rotate that camera about a limited range, such that the user can choose the surrounding background. The video data from the color camera 112 is communicated through the data communications path 109 to the operating system where it will be stored in digitized form. The video data then will be displayed on the interactive visual screen 107 for viewing and approval by the user. It is to be understood that "color camera" refers to cameras that not only produce single images, but to cameras which can produce video images as well.

Microphone 113 is installed within the housing of the internet message system in such a manner that voice communication between the user and the system can be established. The audio data received from microphone 113 is communicated through the data communications path 109 to the operating system where it will be stored in digitized form. Preferably the microphone is of the directional type. However, any microphone which does not limit communication with the user is suitable for use in the present invention.

Electronic stylus 114 is provided so that the user can enter textual or any other hand-written images into the operating system 101 through the data communications path 109. The electronic stylus can be activated either with a touch sensitive area of the interactive visual screen 107 or with an electronic pallet sensitive to the electronic stylus 114. In addition to being used for composing a hand-written message, the electronic stylus can be configured such that the user can supply data to the operating system 101, such as a signature as might be required by the payment system 106.

Audio speaker 108 also is installed within the housing of the internet message and is connected to the operating system through data communications path 109. The audio speaker is configured in such a manner that it can broadcast pre-recorded announcements, salutations and the like, for example, for attracting the attention of potential customers and inviting them to use the internet message system. In addition, the audio speaker 108 can communicate audible data, such as menu selections, to the user.

Figure 2:
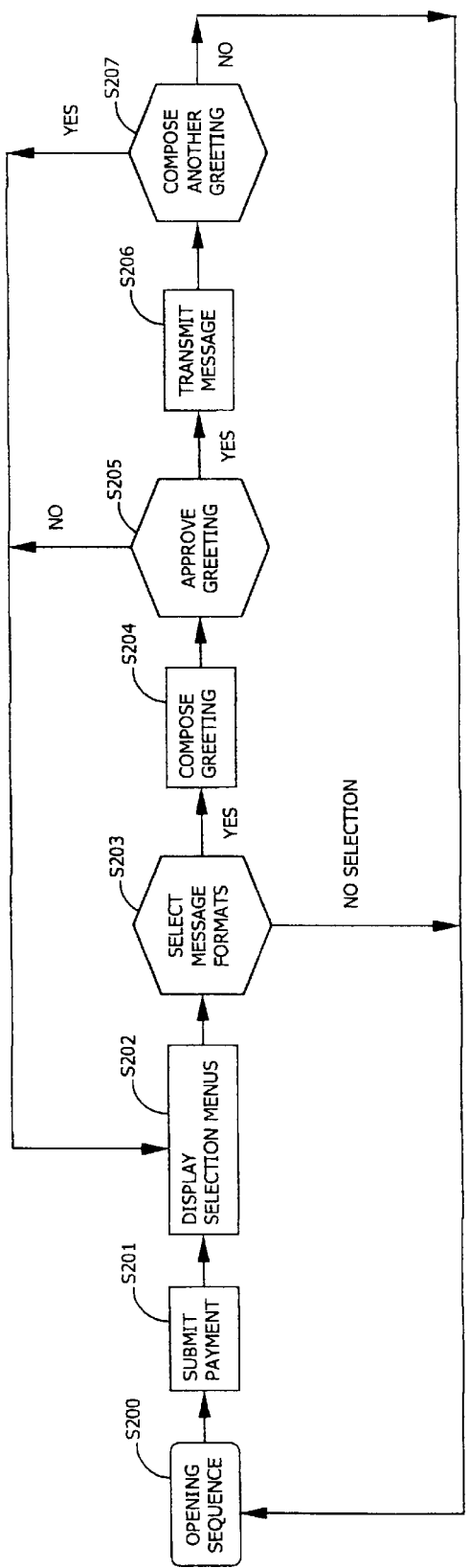
FIG. 2 is a logic diagram illustrating the operational sequence of the internet message system of the present invention.

FIGS. 2 and 3 illustrate the operation of the internet message system of the present invention. Prior to user activation, the internet message system is configured to present an opening sequence S200, in the form of a pre-recorded audio message through the audio speaker 108 and to display a visual message on the interactive visual screen 107, both the audio and visual messages being designed to attract passers-by and to provide initial instructions on accessing the system. The first step S201 in the user operation of the internet message system is for the user to submit payment, such as cash, credit card, pre-paid card or the like, to the payment system 106. Upon verification of the payment by the operating system, the message compilation program is activated.

The activation of the message compilation program is indicated to the user in step S202 in which the selection menus are shown on the interactive visual screen 107, providing the user with several selectable greeting formats for composing the electronic greeting, including still images (real-time and pre-loaded), self-portraits, scanned images, video segments (real-time and pre-loaded), audio segments (real-time and pre-loaded), and text (pre-loaded messages such as "wish you were here" and user-composed text). The user is prompted in step S203 to choose the selectable greeting format(s) he/she desires for the electronic greeting which must be at least one of the depicted formats or may be a combination of several formats, such as image and text. If no selection is made within a specified time period, the message compilation program will return to the pre-recorded audio and visual messages. Once the user has made a selection, the operating system 101 then will activate the required message compilation components 110 for composing the electronic greeting. For example, if the user selects as the greeting format a self-portrait accompanied by a real-time audio greeting and a real time text message (e.g. hand-written greeting), the operating system would activate the color camera 112, the microphone 113 and the electronic stylus 114.

Once the selectable greeting format(s) has been chosen, the electronic greeting is composed in step S204. For instance, if the user has chosen as a selectable greeting format a still-image consisting of a self-portrait of the user incorporating the real-time background environ, the color camera 112 will capture an image of the user and the surrounding background. Or, if the user desires a pre-loaded background image, a selection of pre-loaded background images stored in the operating system will be presented to the user for incorporation into his/her self-portrait. Another still-image option is that the user may choose a completed image, preferably in the style representative of a standard postcard, selected from a collection of pre-loaded still images stored in the operating system 101. An additional still-image option is that the user may desire to compose the image from a photograph, thereby activating the image scanner 111 upon which the user will be requested to insert the photograph into the scanner so that it can be scanned and digitized as described above. Once the user has selected the desired still image, it will appear on the interactive visual screen 107 for the user's viewing and approval.

If the user selects a video segment in step S203, selection options will be presented to the user in step S204 regarding the type of video segment to be incorporated into the electronic greeting. The user may choose a real-time video segment capturing the user in his/her surroundings, or may choose from a pre-loaded collection of video segments. If a real-time video segment is chosen, the color camera 112 will be activated and display on the interactive visual screen 107 what is in the field of view of the color camera. The interactive visual screen and/or the audio speaker 108 will be configured to indicate to the user when the recording of the video segment beings and ends, thereby providing the using with sufficient time to assume a favorable position within the focal range of the camera. When the selected greeting formats are both real-time video and audio segments, the operating system also will activate the microphone 113 in order to record the audio segment concurrent with the video segment.

If the user chooses in step S203 to add text to the electronic greeting format, the selection menus of message compilation program will present the user with the option of utilizing pre-loaded text arrangements stored in the memory of the operating system or of composing his/her own text message, either by entering text directing onto the interactive visual screen 107, a keyboard in communication with the display screen 107 or by electronic stylus 114. If the selection is the pre-loaded text arrangement, the variety of textual arrangements will be displayed on the interactive visual screen and the user will be prompted to select a text arrangement. If the user desires to incorporate a real-time (e.g. hand-written) text arrangement into the electronic greeting, the message compilation program will designate a portion of the interactive visual screen as a sensitive area to the electronic stylus 114. Alternatively, a separate electronic pad may be provided for entering the hand written text.

If an audio segment format is chosen for the electronic greeting in step S203 as part of the message, it preferably should be either a selection from a pre-loaded arrangement of audio segments, or should be recorded simultaneously with the video segment using microphone 113.

Once the user has selected the desired format or formats for the electronic greeting, the message compilation program will display the completed greeting message on the interactive visual screen 107 so that the user can review the greeting message and will prompt the user to indicate his satisfaction with the message by selecting YES or NO in step S205. If the user selects NO, the user will be directed back to step S202 of the message compilation program. The operating system will allow the user to select NO a predetermined number of times before canceling the message compilation program and returning to the opening sequence. If the user selects YES, the message compilation program will continue to step S206 and request that the user enter at least one e-mail address on the keyboard. As noted above, the keyboard can be either a conventional stand-alone keyboard or may be a touch-sensitive keyboard integrated with the interactive visual screen 107. The operating system 101 transforms the electronic greeting into a form capable of being transmitted over the Internet and transmit the electronic greeting to the e-mail address(es) using the network interface system 103.

Following successful transmission of the electronic greeting, the user will be invited to compose another greeting message in step S207. If the user selects YES, the message compilation program will return to step S202. If the user selects NO, the message compilation program will be terminated and the operating system will revert back to the opening sequence S200.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. An internet message system for transmitting an electronic greeting over the Internet comprising
    (a) an operating system comprising a power management system, a data management system, at least one storage device for maintaining a database of pre-loaded greeting formats and software capable of running said operating system, said software including a message compilation program;
    (b) a power interface system which interacts with said power management system;

(c) a network interface system which is configured to receive and transmit data from said data management system to outside networks;

(d) a payment system capable of receiving and verifying payment and transmitting an activation code to said data management system upon receipt and verification of payment;

(e) an interactive visual screen;

(f) at least one electronic greeting composition component selected from the group consisting of an image scanner, a color camera capable of capturing a self-portrait still image of an individual standing in front of said color camera, and combinations thereof, said at least one electronic greeting composition component being controlled by said data management system, wherein, upon receiving said activation code from said payment system, said data management system initializes said message compilation program and activates a menu of selectable greeting formats on said interactive visual screen, composes said electronic greeting and transmits said electronic greeting over the Internet through said network interface system.

2. The internet message system in accordance with claim 1, wherein said database of pre-loaded greeting formats includes still images, video segments, audio segments and text messages.

3. The internet message system in accordance with claim 1, further comprising an audio speaker, said internet message system being configured with an opening sequence in the form of a pre-recorded audio message provided through said audio speaker and a visual message displayed on said interactive visual screen.

4. The internet message system in accordance with claim 1, wherein said operating system, said power interface system, said network interface system, said payment system, said interactive visual screen and said at least one electronic greeting composition component are contained within a housing, said housing being a self-contained unit capable of being adapted into a free-standing unit.

5. The internet message system in accordance with claim 1, wherein said payment system is capable of accepting and verifying payments in the form of cash, pre-paid cards and payment cards.

6. The internet message system in accordance with claim 5, wherein when payment is in the form of a payment card, the payment system extracts data from the payment card and through the data management system transmits the extracted data through the network interface system to a payment card processing center network for approval and authorization.

7. The internet message system in accordance with claim 1, wherein said interactive visual screen includes a device integrated therewith for the entry of typed alpha-numeric characters.

8. The internet message system in accordance with claim 7, wherein said device is in the form of a keyboard.

9. The internet message system in accordance with claim 1, wherein said selectable greeting formats include self-portraits, scanned images, real-time and pre-loaded still images, pre-loaded audio segments, real-time and pre-loaded audio segments and pre-loaded text messages and combinations thereof.

10. The internet message system in accordance with claim 9, wherein said electronic greeting is composed of at least one selectable greeting format.

11. The internet message system in accordance with claim 10, wherein when said selectable greeting format is a self-portrait and wherein said data management system activates said color camera.

12. The internet message system in accordance with claim 11, wherein said color camera incorporates the surrounding environ of the individual standing in front of said color camera.

13. The internet message system in accordance with claim 10, wherein when said selectable greeting format is a real-time video segment, said data management system activates said color camera, said color camera being capable of capturing a real-time video segment within the focal range of said color camera.

14. The internet message system in accordance with claim 13, wherein said selectable greeting format is a real-time video segment of an individual standing in front of said color camera and the surrounding environ.

15. The internet message system in accordance with claim 10, wherein when said selectable greeting format is composed of a scanned imaged, said data management system activates said image scanner, said image scanner being capable of capturing the image from a scanned photograph.

16. The internet message system in accordance with claim 1, further comprising at least one additional electronic greeting composition component selected from the group consisting of a microphone and an electronic stylus.

17. The internet message system in accordance with claim 16, further comprising an audio speaker, said internet message system being configured with an opening sequence in the form of a pre-recorded audio message provided through said audio speaker and a visual message displayed on said interactive visual screen.

18. The internet message system in accordance with claim 16, wherein said operating system, said power interface system, said network interface system, said payment system, said interactive visual screen and said at least one electronic greeting composition component are contained within a housing, said housing being a self-contained unit capable of being adapted into a free-standing unit.

19. The internet message system in accordance with claim 16, wherein said selectable greeting formats include self-portraits, scanned images, real-time and pre-loaded still images, real-time and pre-loaded video segments, real-time and pre-loaded audio segments and real-time and pre-loaded text messages and combinations thereof.

20. The internet message system in accordance with claim 19, wherein when said selectable greeting format is a real-time audio segment, said data management system activates said microphone, said microphone being capable of capturing within the audio range of said microphone.

21. The internet message system in accordance with claim 19, wherein when said selectable greeting format is a combination of a real-time video segment and a real-time audio segment, said data management system activates both said color camera and said microphone in order to capture both the real-time video images within the focal range of said color camera and real time sounds within the audio range of said microphone.

22. The internet message system in accordance with claim 19, wherein said real-time text message includes handwritten text messages and typed text messages.

23. The internet message system in accordance with claim 22, wherein when said selectable greeting format is a hand-written text message, said data management system activates said electronic stylus, said electronic stylus being capable of capturing a hand-written message.

24. The internet message system in accordance with claim 22, wherein when said selectable greeting format is a typed text message, said data management system activates a device integrated with said interactive visual screen for entry of typed alpha-numeric characters.

* * * * *